(12) United States Patent
Voevodkin

(10) Patent No.: US 6,470,127 B2
(45) Date of Patent: Oct. 22, 2002

(54) PHOTONIC BAND-GAP LIGHT-EMITTING FIBERS

(75) Inventor: George Voevodkin, Torrance, CA (US)

(73) Assignee: Intelligent Optical Systems, Inc., Torrance, CA (US)

( * ) Notice: Subject to any disclaimer, the term of this patent is extended or adjusted under 35 U.S.C. 154(b) by 0 days.

(21) Appl. No.: 09/774,967

(22) Filed: Jan. 31, 2001

(65) Prior Publication Data
US 2002/0102081 A1 Aug. 1, 2002

(51) Int. Cl.⁷ .................................................. G02B 6/02
(52) U.S. Cl. ........................... 385/123; 385/27; 385/28; 385/125; 385/126; 385/127; 385/141; 385/142; 385/122
(58) Field of Search ........................... 385/27, 28, 123, 385/124, 125, 126, 127, 128, 140, 122, 141, 142

(56) References Cited

U.S. PATENT DOCUMENTS

| | | | | |
|---|---|---|---|---|
| 5,802,236 A | * | 9/1998 | DiGiovanni et al. | 385/127 |
| 5,973,823 A | * | 10/1999 | Koops et al. | 359/322 |
| 6,064,506 A | * | 5/2000 | Koops | 359/237 |
| 6,075,915 A | * | 6/2000 | Koops et al. | 385/125 |
| 6,097,870 A | * | 8/2000 | Ranka et al. | 385/127 |
| 6,278,105 B1 | * | 8/2001 | Mattia | 359/326 |
| 6,301,420 B1 | * | 10/2001 | Greenaway et al. | 385/126 |

\* cited by examiner

*Primary Examiner*—Brian Healy
(74) *Attorney, Agent, or Firm*—Marvin H. Kleinberg; Marshall A. Lerner; Kleinberg & Lerner, LLP

(57) ABSTRACT

A photonic band-gap (PBG) light-emitting fiber, including two-dimensional PBG structures in an environmentally robust glass matrix. The fiber limits photon emission to directions collinear with the fiber core to increase fluorescence and scintillation collection efficiency. The PBG structures are comprised of a plurality of high refractive index inclusions to increase the light-trapping efficiency of the fiber.

16 Claims, 1 Drawing Sheet

PHOTONIC BAND-GAP LIGHT-EMITTING FIBERS

FIELD OF THE INVENTION

The present invention relates generally to the use of glass, polymer, crystal or silica-based photonic band-gap materials to create Photonic Band-gap Light Emitting Fibers (PBGLEF).

The technology is based on the ability of periodic dielectric structures i.e., Photonic Band-gap (PBG) structures, to modify the radiative properties of light sources inside the structures.

The unique properties of a PBG permits the fabrication of scintillating light and fluorescent light optical fibers, for use in image and radiation detection devices laser, amplifier, and other optical device applications, with light-trapping efficiencies greater than that obtained with conventional fibers.

BACKGROUND OF THE INVENTION

Conventional scintillating light optical fibers typically consist of a glass core covered with a cladding material where the refractive index of the core material is higher than the refractive index of the cladding material. The mismatch of refractive indices sets the condition for total internal reflection within the fiber to trap scintillating light, and gives the fiber its wave guiding properties. Typically, a multimode fiber traps less than 4% of the scintillating light contained within its total reflection cones.

The additional photons guided within multi-clad fibers increases the output signal over conventional single clad fibers, bringing the total light-trapping efficiency up to 6%.

Clearly, a need exists to improve the efficiency of conventional optical fibers to increase the fiber's light trapping efficiency.

Photonic crystals, having periodic dielectric nanostructures that produce photonic band-gaps, are unique materials that affect the density of electromagnetic states within their boundaries. They can affect the radiative dynamics within their structure to change the properties of optical devices fabricated from these materials. The concept of photonic band-gap materials, first proposed by Yablonovich, "Photonic band structures", *J. Mod. Opt.*, Vol. 41, pp. 171–404, 1994 is well known in the art and has stimulated a large amount of theoretical and experimental work.

Electronic waves traveling in the periodic potential of a crystal are arranged into energy bands separated by gaps in which propagating states are prohibited. When a wave propagates in a periodic structure (in any number of dimensions), the dispersion curves that relate the frequencies of the wave to the wave vector, characterizing its propagation, possess a number of branches. These branches form bands that are separated by frequency gaps at points of symmetry in the corresponding Brillouin zones (i.e., a frequency range in which no wave can propagate) that exist for all values of the wave vector in the Brillouin zone. This also gives rise to a gap in the density of the states of the waves propagating through the structure. Clear PBG-induced gaps in the emission spectra of internal sources have been observed as reported in the work of E. P. Petrov, V. N. Bogomolov, I. I. Kalosha, and S. V. Gaponenko, "Spontaneous emission of organic molecules embedded in a photonic crystal", *Phys. Rev. Lett.*, Vol.81, pp. 77–80, 1998.

PBG materials modify the spontaneous emission rate of excited atoms and spontaneous emission is inhibited when the imbedded atom has an emission frequency in the band gap. The absence of electromagnetic modes inside a photonic band-gap permits atoms or molecules imbedded in a dielectric crystal to be locked in an excited state if the energy of this state, relative to the ground state, falls within the photonic band-gap.

The localization properties of photons in a PBG structure are similar to those of electrons in the band-gap of a semiconductor. For frequencies within the photonic band-gap, photons incident from outside the material will be perfectly reflected.

A dielectric crystal that reflects electromagnetic waves incident from any angle can be fabricated. Three-dimensional dielectric structures have been found to exhibit a photonic band-gap. In practice, however, these dielectric crystals have complex structures and their fabrication is difficult to accomplish.

Two-dimensional lattice structures however, will behave as a PBG for in-plane incident waves and the simplicity of the geometry facilitates fabrication of these dielectric crystals.

Photonic band-gap structures comprise a periodic lattice of materials of one dielectric with a high refractive index imbedded in another material of low refractive index, where the inclusions act like atoms in a crystalline structure. Arrays of dielectric material can be periodically arranged along two axis (x and y), and be homogeneous in the third direction (z).

BRIEF SUMMARY OF THE INVENTION

In accordance with the principles of the present invention, controlled nanometer variations in the refractive index of PBG crystals are created to fabricate highly ordered nanostructures (10 nm to 1000 nm) in an environmentally robust glass polymer or crystal matrix. The invention comprises two-dimensional PBG structures that are composed of a plurality of regular high refractive index inclusions, instead of the "air holes" typically employed in PBG fibers.

The invention uses PBG structures to limit the manifold of emission modes to those that emit photons only in the axial direction (i.e., parallel to the length of the fiber).

Fibers designed with the two-dimensional PBG structures of the invention can overcome the current limitations of existing scintillating fiber and fiber amplifier technologies by modifying the spontaneous emission rate of excited atoms having an emission frequency in the band gap. As such, a light-trapping efficiency at least one order of magnitude higher than that of a standard fiber can be achieved.

Using the principles of the invention, large refractive index steps can be obtained in an all solid-state fiber. In addition, large diameter single-mode core fibers can be fabricated with a strong and well-controlled shift in dispersion to guide light in a single propagation mode and dramatically lower transmission losses. Further, the PBG structure of the invention limits photon emission to directions collinear with the fiber core to increase fluorescence and scintillation collection efficiency.

The two-dimensional PBG's of the invention permits the fabrication of high efficiency light-trapping fluorescent and scintillating light fibers, for improved performance in fiber amplifiers, lasers, and detectors. Additionally, essentially lossless devices can be designed into fiber structures to reduce significantly the interaction length required for amplifiers or other devices (such as couplers and splitters).

In one embodiment of the invention, an all-silica photonic band-gap structure is used to fabricate a high-efficiency, scintillating light fiber. In another embodiment of the invention, an all-silica, rare-earth doped photonic bandgap structure is used to fabricate a high-efficiency, large diameter, single mode fluorescent fiber.

DETAILED DESCRIPTION OF THE INVENTION

Figure 1:
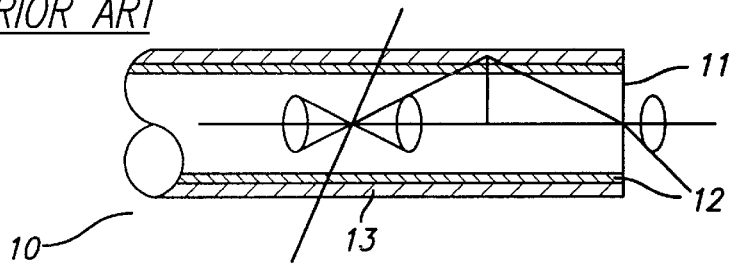
FIG. 1 is an illustrative view of a conventional scintillating light fiber.

As shown in FIG. 1, a conventional multi-mode scintillating fiber 10 comprises a core 11, a first cladding 12 and a second cladding 13 where the refractive index of the core is higher than the refractive index of the first cladding and the refractive index of the second cladding. Multi-clad fibers typically have total internal reflection at the first and second cladding interface and a light trapping efficiency up to 6%.

Figure 2:
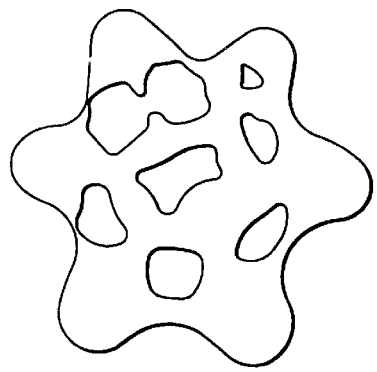
FIG. 2 is an end view of the structure of a PBG fiber of the invention.

In accordance with the principles of the invention, a PBG fiber is drawn from a stock of rods in a conventional drawing tower forming a structure similar to that shown in the end view of FIG. 2 for a multi-core fiber. The fiber is fabricated from scintillator-doped silica using a method similar to that used by Knight et al, "All-silica single-mode optical fiber with photonic crystal cladding", Opt. Lett., Vol. 21,pp. 1547–1549, 1996, and has a hexagonal or triangular array of high refractive index inclusions 31 running down its length as shown in FIGS. 3 and 4.

Figure 3:
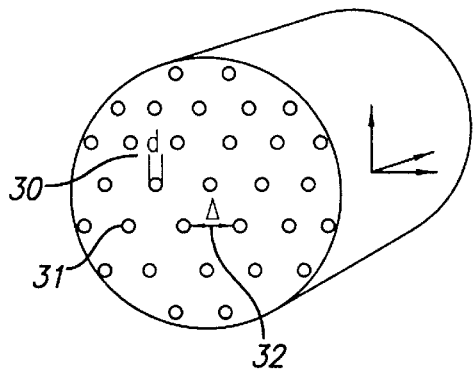
FIG. 3 is an illustrative view of a PBG scintillating light fiber.

FIG. 3 shows a PBG scintillating fiber of the invention, doped through the whole volume of the fiber with light-emitting material. The effective index or V value of the PBG fiber tends to reach some finite value $V_0$ that depends on the diameter (d) 30 of the high refractive index inclusions 31 relative to the separation or pitch ($\Lambda$) 32 of the inclusions.

If the inclusions are small enough for $V_0$ to be less than the V value at the second-mode cutoff, the fiber is single mode at all wavelengths. For the present invention, the V value is near 2.5, which is close to the value for single mode fibers.

Figure 4:
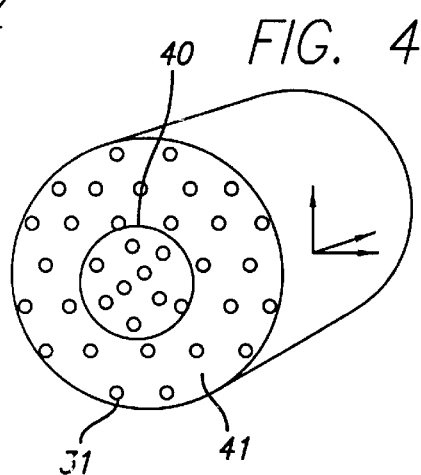
FIG. 4 is an illustrative view of a single mode light emitting fiber for amplifiers and lasers.

In the case of a single mode fiber, suitable for amplifiers and lasers, the central rod 40 is doped with rare earth ions such as Er, Yb, Pr, and Tm and with inclusions as described in FIG. 3, as shown in FIG. 4. The resulting central solid region 40 is the core, and the remaining two-dimensional PBG structure, with the array of high refractive index inclusions 31, is the cladding 41. The diameter of the core 40 is roughly twice the separation $\Lambda$(or pitch) 32 of the high refractive index inclusions 31 as shown in FIG. 3. Size separation and refractive indices of inclusions in the core and the cladding are not the same.

PBG fibers can be single mode throughout a broad wavelength range from 337 nm to beyond 1550 nm, because of the unusual properties of the claddings effective index (V). The fiber should also remain single-mode if the length of the fiber is changed, provided the ratio of the diameter of the inclusions to the diameter is fixed. A single-mode PBGF with a large core can therefore be made, without adjustment of the material's refractive index, simply by drawing a larger fiber.

Figure 5:
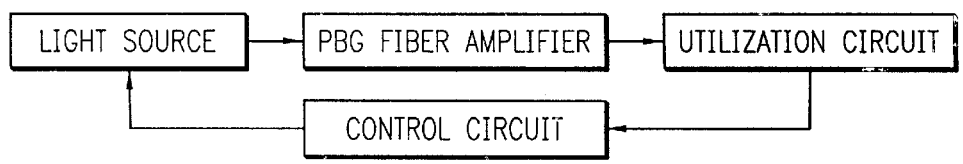
FIG. 5 is an illustrative view of a PBG fiber amplifier apparatus.

Fibers with large mode areas can carry higher power, for a given intensity, and so are less susceptible to damage and signal degradation by nonlinear processes. Such fibers can be used to lengthen repeater spacing in TCM links, for example, or can be used in high-power single mode fiber lasers and amplifiers as shown in FIG. 5. The PBGLEF of the invention readily provides single mode guidance with a large core and the useable core size is ultimately limited only by bend losses in the fiber.

Two-dimensional PBG nanostructures, such as those shown in FIGS. 3 and 4, can be fabricated using a sol-gel process to produce silica glass with a highly controllable refractive index, in the range of 1.45 to 2.2, by varying the fraction of dopant material, such as $TiO_2$, used in the process. The use of a sol-gel fabrication process is well known in the art and can provide higher refractive index steps than that provided in a PBG "holey fiber". Typical refractive index step increases from 0.45 to 0.75 in a fiber can be achieved.

In summary, the PBGLEF design of the invention will increase fluorescence and scintillation collection efficiency by limiting photon emission to directions collinear with the fiber core and will dramatically lower transmission losses by guiding light in a single propagation mode in a large diameter single mode structure.

Although the various features of novelty that characterize the invention have been described in terms of certain preferred embodiments, other embodiments will become apparent to those of ordinary skill in the art, in view of the disclosure herein. Accordingly, the present invention is not intended to be limited by the recitation of the preferred embodiments, but is instead intended to be defined solely by reference to the appended claims.

What is claimed is:

1. A photonic band-gap light-emitting fiber comprising: a body doped with light emitting materials and containing light guiding dielectric crystal lattice structures; said structures including a plurality of high refractive index inclusions; and said inclusions being taken from a class of inclusions limiting the emission modes to those that emit photons only in the axial direction parallel to the length of the fiber.

2. The fiber of claim 1 wherein said lattice structures are two-dimensional.

3. The fiber of claim 1 wherein said lattice structures are two-dimensional photonic band-gap structures in a glass matrix.

4. The fiber of claim 1 wherein said high refractive index inclusions are structured in a hexagonal array.

5. The fiber of claim 1 wherein said high refractive index inclusions are structured in a triangular array.

6. The fiber of claim 1 wherein said lattice structures comprise an array of dielectric material periodically arranged along two axis.

7. A cylindrically-shaped photonic band-gap light-emitting fiber having a diameter in the range of 10 micrometers to 1000 micrometers comprising:
a body containing light guiding dielectric crystal lattice structures; said structures including a plurality of high reflective index inclusions having a diameter ranging from 10 nanometers to 1000 nanometers; and
said inclusions limiting the emission modes to those that emit photons only in the axial direction parallel to the length of said fiber.

8. The fiber of claim 1 fabricated using a silica glass sol-gel process.

9. The fiber of claim 5 fabricated using a silica glass sol-gel process.

10. A scintillating light single mode photonic band-gap light-emitting fiber having an inner core and an outer core comprising:

light guiding dielectric crystal lattice structures in said inner and outer cores; said structures including a plurality of high refractive index inclusions; said inclusions limiting the emission modes to those that emit photons only in the axial direction parallel to the length of said fiber; and said inner core being doped with light-emitting material.

11. A photonic band-gap light-emitting fiber comprising:

light guiding dielectric crystal lattice structures; said structures including a plurality of high refractive index inclusions; said inclusions being taken from a class of inclusions limiting the emission modes to those that emit photons only in the axial direction parallel to the length of said fiber; and said fiber modifying the spontaneous emission rate of excited atoms having an emission frequency in the band-gap.

12. A photonic band-gap light-emitting fiber comprising:

an elongated body containing light guiding dielectric crystal lattice structures; said structures including a plurality of high refractive index inclusions; and said inclusions being taken from a class of inclusions limiting the emission modes to those that emit photons only in the axial direction parallel to the length of said fiber; and said fiber guiding light in a single propagation mode.

13. An optical fiber amplifier apparatus comprising:

a light source;

a photonic band-gap light-emitting fiber containing light guiding dielectric lattice crystal structures for limiting photon transmission to the axial direction;

a control circuit; and a utilization circuit wherein light from said source is adaptively controlled by said control circuit and transmitted by said fiber to said utilization circuit.

14. A photonic band-gap light-emitting fiber comprising:

a core including light guiding dielectric crystal lattice structures, said structures including a plurality of inclusions having a higher refractive index than the surrounding core, said inclusions being taken from a class of inclusions that limit emission modes to those that emit photons only in the axial direction, parallel to the length of said core.

15. The fiber of claim 14, further comprising:

an inner core including light guiding dielectric crystal lattice structures, said structures including a plurality of inclusions having a higher refractive index than the surrounding inner core, said inner core inclusions being more densely packed than said core inclusions, said inner core inclusions being taken from said class of inclusions whereby photons are emitted in said inner core only in the axial direction, parallel to the length of said inner core.

16. The fiber of claim 15, wherein said core acts as a photonic band gap cladding about said inner core.

* * * * *